US010820196B2

(12) United States Patent
Nguyen et al.

(10) Patent No.: US 10,820,196 B2
(45) Date of Patent: Oct. 27, 2020

(54) ONBOARD NETWORK SYSTEMS FOR PASSENGER AIRCRAFT AND METHODS OF OPERATING THEREOF

(71) Applicant: The Boeing Company, Chicago, IL (US)

(72) Inventors: Nha Thanh Nguyen, Shoreline, WA (US); Timothy M. Mitchell, Seattle, WA (US); Oanh T. Kha, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 16/206,333

(22) Filed: Nov. 30, 2018

(65) Prior Publication Data

US 2020/0178071 A1    Jun. 4, 2020

(51) Int. Cl.
| | |
|---|---|
| *H04L 29/06* | (2006.01) |
| *H04W 12/00* | (2009.01) |
| *H04W 12/08* | (2009.01) |
| *H04W 12/12* | (2009.01) |
| *H04W 4/02* | (2018.01) |
| *H04W 4/48* | (2018.01) |

(52) U.S. Cl.
CPC ..... *H04W 12/00505* (2019.01); *H04L 63/107* (2013.01); *H04L 63/1416* (2013.01); *H04L 63/1441* (2013.01); *H04W 4/025* (2013.01); *H04W 12/0802* (2019.01); *H04W 12/1204* (2019.01); *H04W 4/48* (2018.02)

(58) Field of Classification Search
CPC .. G06F 21/53; G06F 21/62; H04W 12/00505; H04W 12/1204; H04W 12/0802; H04W 4/025; H04W 4/48; H04L 63/107; H04L 63/14; H04L 63/1408; H04L 63/1416; H04L 63/1425; H04L 63/1441; H04L 63/145; H04L 63/1491; H04L 63/12
See application file for complete search history.

(56) References Cited

U.S. PATENT DOCUMENTS

| | | | |
|---|---|---|---|
| 6,995,658 B2 | 2/2006 | Tustison et al. | |
| 7,893,557 B2 | 2/2011 | Davis et al. | |
| 7,984,500 B1 * | 7/2011 | Khanna | G06F 21/552 709/225 |

(Continued)

*Primary Examiner* — Malcolm Cribbs
(74) *Attorney, Agent, or Firm* — Kwan & Olynick LLP

(57) ABSTRACT

Disclosed are onboard network systems for passenger aircrafts and methods of operating thereof. Specifically, an onboard network system is configured to handle various requests (e.g., communication, entertainment) from passenger devices during aircraft operation. Each request is first received at a cabin virtual router, which determines the security threat associated with this request and, if the security threat exceeds a security threshold, performs a corresponding security operation. In some examples, the cabin virtual router is configured to disable its operation entirely, e.g., if the security threat is high. In other examples, the cabin virtual router switches to a new operating system and/or throttles its operation. The cabin virtual router effectively isolates other components of the onboard network system (e.g., a flight deck) from potential threats associated with the passenger devices using this system. Security threats are analyzed to reconfigure the cabin virtual router on the aircraft and/or entire fleet.

20 Claims, 8 Drawing Sheets

(56) References Cited

U.S. PATENT DOCUMENTS

| | | |
|---|---|---|
| 8,929,465 B2 | 1/2015 | Lee et al. |
| 8,942,865 B2 | 1/2015 | Kumar et al. |
| 8,948,934 B2 | 2/2015 | Lee et al. |
| 9,100,104 B2 | 8/2015 | Nguyen et al. |
| 9,295,032 B2 | 3/2016 | Kumar et al. |
| 9,350,423 B2 | 5/2016 | Mitchell et al. |
| 9,425,859 B2 | 8/2016 | Mitchell et al. |
| 9,436,569 B2 | 9/2016 | Lee et al. |
| 9,515,700 B2 * | 12/2016 | Sampigethaya .......... H04B 3/54 |
| 9,598,180 B1 * | 3/2017 | Browder ................ B64D 45/08 |
| 9,667,316 B2 | 5/2017 | Nguyen et al. |
| 9,900,082 B1 * | 2/2018 | Chowdhury ........ H04L 41/0806 |
| 9,930,529 B2 | 3/2018 | Mitchell |
| 10,382,461 B1 * | 8/2019 | Sharifi Mehr ...... H04L 63/1425 |
| 2011/0225644 A1 * | 9/2011 | Pullikottil ........... H04L 63/1425 |
| | | 726/11 |
| 2012/0031634 A1 * | 2/2012 | Lewinski ................. A62C 3/08 |
| | | 169/62 |
| 2014/0230073 A1 * | 8/2014 | Liang ..................... H04N 21/00 |
| | | 726/27 |
| 2014/0254693 A1 | 9/2014 | Mitchell et al. |
| 2014/0312682 A1 | 10/2014 | Lee et al. |
| 2015/0180892 A1 * | 6/2015 | Balderas ............. H04L 63/1416 |
| | | 726/11 |
| 2017/0171170 A1 * | 6/2017 | Sun ..................... H04L 67/2814 |
| 2017/0366576 A1 * | 12/2017 | Donahue ............ H04L 63/1425 |
| 2019/0318164 A1 * | 10/2019 | Kumar .................. B64D 45/00 |

* cited by examiner

ONBOARD NETWORK SYSTEMS FOR PASSENGER AIRCRAFT AND METHODS OF OPERATING THEREOF

BACKGROUND

Data networks are typically accessed by multiple devices controlled by different users. For example, a building network may be accessed by computers, smart phones, and other like devices of building occupants as well as by various building systems and services, such as a heating-ventilation-air-conditioning (HVAC) system, security system, and the like. While sharing a network among different devices and users is cost effective and convenient, the security of a shared network is general less than that of a network with a restricted access. At the same time, shared networks may be used for handling various important operations, such as controlling various functions of vehicles and the like.

What is needed are methods and systems with enhanced control of onboard network systems for passenger aircrafts where the onboard network systems are at least partially accessible to passenger devices during operation of the passenger aircrafts.

SUMMARY

Disclosed are onboard network systems for passenger aircrafts and methods of operating thereof. Specifically, an onboard network system is configured to handle various requests (e.g., communication, entertainment) from passenger devices during aircraft operation. Each request is first received at a cabin virtual router, which determines the security threat associated with this request and, if the security threat exceeds a security threshold, performs a corresponding security operation. In some examples, the cabin virtual router is configured to disable its operation entirely, e.g., if the security threat is high. In other examples, the cabin virtual router switches to a new operating system and/or throttles its operation. The cabin virtual router effectively isolates other components of the onboard network system (e.g., a flight deck) from potential threats associated with the passenger devices using this system. Security threats are analyzed to reconfigure the cabin virtual router on the aircraft and/or entire fleet.

Illustrative, non-exclusive examples of inventive features according to the present disclosure are described in the following enumerated paragraphs:

A1. A method 400 for controlling operations of onboard network system 100 in cabin 210 of passenger aircraft 200, method 400 comprising:
receiving, at cabin virtual router 175 of onboard network system 100, request 185 from passenger device 180 located in cabin 210 of passenger aircraft 200;
determining, at cabin virtual router 175, security threat 176 associated with request 185 received from passenger device 180;
comparing security threat 176 to one or more security thresholds, each of the one or more security thresholds corresponding to one of one or more security operations;
if security threat 176 exceeds at least one security threshold of the one or more security thresholds,
performing a security operation, selected from one or more security operations 402 and corresponding to the at least one security threshold exceeded by security threat 176 and
updating security log 178 with security threat 176; and
if security threat 176 is below each of the one or more security thresholds, transmitting request 185 from cabin virtual router 175 to cabin router 150 of onboard network system 100.

A2. Method 400 of paragraph A1, wherein:
the one or more security thresholds comprises a first threshold,
the first threshold corresponds to first security operation 403 of one or more security operations 402,
the first security operation 403 comprises disabling cabin virtual router 175, A3. Method 400 of paragraph A2, wherein first security operation 403 further comprises identifying location of passenger device 180 in cabin 210 of passenger aircraft 200.

A4. Method 400 of paragraph A3, wherein identifying location of passenger device 180 in cabin 210 of passenger aircraft 200 comprises at least one of
determining signal strength from passenger device 180 at multiple area distribution devices 160 positioned at different locations in cabin 210 of passenger aircraft 200, or
receiving input from flight crew device 152.

A5. Method 400 of any one of paragraphs A1-A4, wherein:
the one or more security thresholds comprises a second threshold, different than the first threshold,
the second threshold corresponds to second security operation 404 of one or more security operations 402,
the second security operation 404 comprises switching to cabin virtual outer 175 from a first operating system to a second operating system.

A6. Method 400 of paragraph A5, wherein the second operating system has a higher security threat resistance than the first operating system.

A7. Method 400 of paragraph A5, wherein:
the second threshold is lower than the first threshold,
performing the security operation comprises performing only second security operation 404.

A8. Method 400 of paragraph A5, wherein second security operation 404 further comprises blocking, at cabin virtual router 175, request 185 received from passenger device 180.

A9. Method 400 of any one of paragraphs A1-A8, wherein:
the one or more security thresholds comprises a third threshold, different than the first threshold and the second threshold,
the third threshold corresponds to third security operation 405 of one orf more security operations 402, and
third security operation 405 comprises modifying request 185 received from passenger device 180 at cabin virtual router 175, thereby generating modified request 187 and transmitting modified request 187 from cabin virtual router 175 to cabin router 150.

A10. Method 400 of paragraph A9, wherein modified request 187, generated at cabin virtual router 175, is throttled down in comparison to request 185, received from passenger device 180.

A11. Method 400 of paragraph 9, wherein:
the third threshold is lower than each of second threshold and first threshold, and
performing security operation comprises performing only third security operation 405.

A12. Method 400 of any one of paragraph A1-A11, wherein updating security log 178 comprises at least one of:
recording an IP address of passenger device 180,
recording a time of request 185 received from passenger device 180, or recording the at least one security threshold exceeding the at least one security threshold.

A13. Method 400 of any one of paragraph A1-A12, further comprising, using onboard network system 100, transmitting security log 178 from passenger aircraft 200 to aircraft operator 610.

A14. Method 400 of paragraph A13, further comprising receiving, at onboard network system 100, updated version of cabin virtual router 175, wherein updated version of cabin virtual router 175 is generated by aircraft operator 610 based on at least an additional security log received from an additional passenger aircraft.

A15. Method 400 of paragraph A14, wherein cabin virtual router 175 is generated by aircraft operator 610 based on multiple security logs received from a fleet of passenger aircrafts.

A16. Method 400 of any one of paragraph A1-A15, further comprising, using onboard network system 100, updating cabin virtual router 175 based on security log 178.

A17. Method 400 of any one of paragraph A1-A16, further comprising resetting cabin virtual router 175 when passenger aircraft 200 is landed.

A18. Onboard network system 100 for controlling network communication in cabin 210 of passenger aircraft 200, onboard network system 100 comprising:
cabin router 150; and
cabin virtual router 175, communicatively coupled to cabin router 150 and configured to:
 receive request 185 from passenger device 180 located in cabin 210 of passenger aircraft 200;
 determine security threat 176 associated with request 185 received from passenger device 180;
 compare security threat 176 to one or more security thresholds, each of the one or more security thresholds corresponding to one of one or more security operations;
 perform a security operation when security threat 176 exceeds at least one security threshold of the one or more security thresholds, the security operation selected from one or more security operations 402 and corresponding to the at least one security threshold exceeded by security threat 176 and update security log 178 with security threat 176; and
 transmitting request 185 from cabin virtual router 175 to cabin router 150 of onboard network system 100, when security threat 176 is below each of the one or more security thresholds.

A19. Onboard network system 100 of paragraph A18, further comprising security log database 177, configured to store security log 178, updatable by cabin virtual router 175, and to transmit security log 178 to aircraft operator 610.

A20. Onboard network system 100 of paragraph 18, wherein cabin virtual router 175 has first operating mode 191, second operating mode 191, and third operating mode 193, wherein:
in first operating mode 191, cabin virtual router 175 uses first operating system 171;
in second operating mode 192, cabin virtual router 175 uses second operating system 172, different from first operating system 171; and
in third operating mode 193, cabin virtual router 175 is disabled.

A21. Cabin virtual router 175, comprising a computer usable medium having a computer readable program code embodied therein, said computer readable program code adapted to be executed to implement method 400 for controlling operations of onboard network system 100 in cabin 210 of passenger aircraft 200, method 400 comprising: receiving, at cabin virtual router 175 of onboard network system 100, request 185 from passenger device 180 located in cabin 210 of passenger aircraft 200;
determining, at cabin virtual router 175, security threat 176 associated with request 185 received from passenger device 180;
comparing security threat 176 to one or more security thresholds, each of one or more security thresholds corresponding to one of one or more security operations;
if security threat 176 exceeds at least one security threshold of one or more security thresholds,
 performing a security operation, selected from one or more security operations 402 and corresponding to at least one security threshold exceeded by security threat 176 and
 updating security log 178 with security threat 176; and
if security threat 176 is below each of one or more security thresholds, transmitting request 185 from cabin virtual router 175 to cabin router 150 of onboard network system 100.

DETAILED DESCRIPTION

Figure 1:
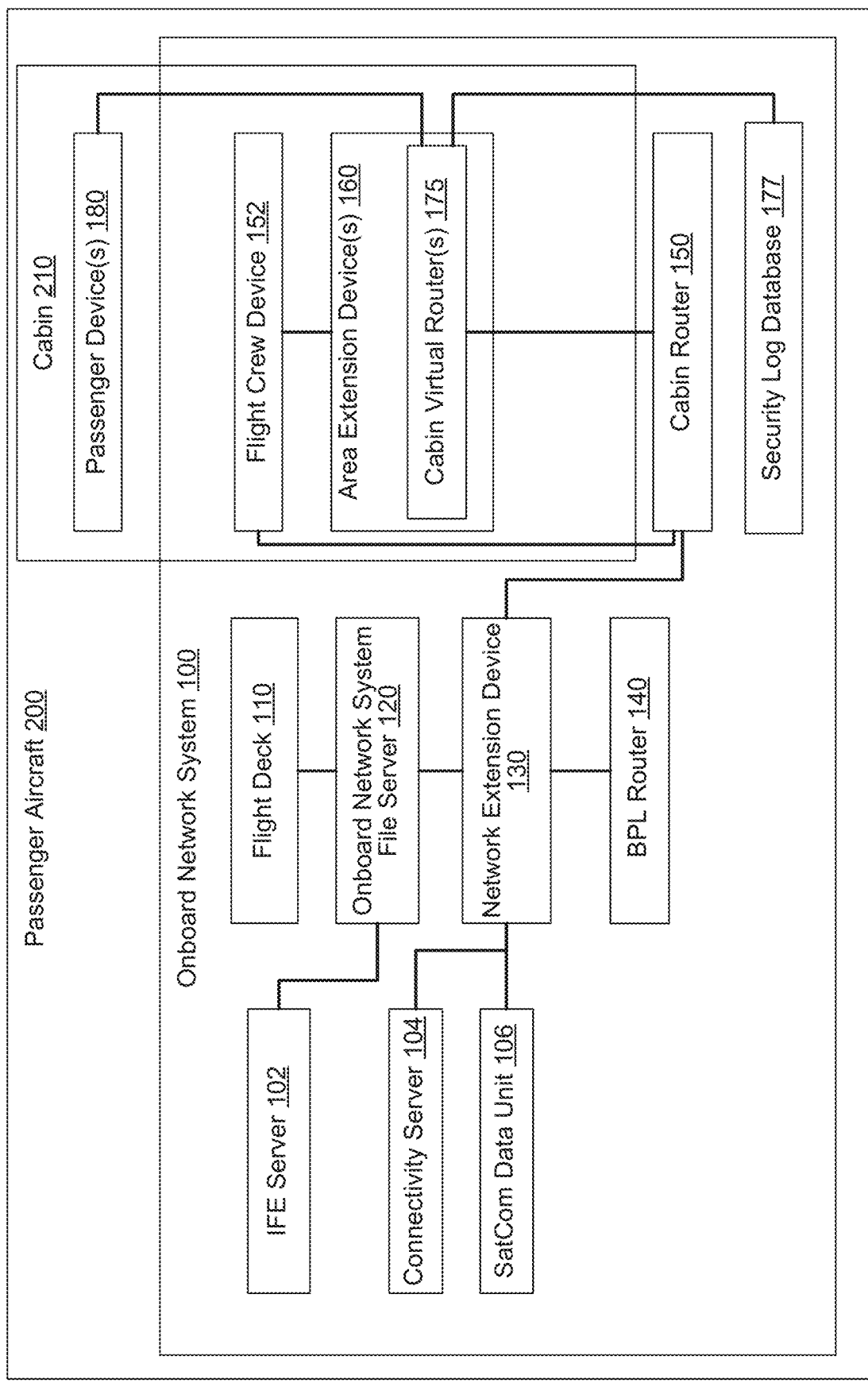
FIG. 1 is a block diagram of an onboard network system for use on passenger aircrafts, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Unlike conventional network systems (e.g., ground-based network systems), onboard network systems, used in passenger aircraft, operate in different types of environment and have different security concerns. First, all users of an onboard network system are physically located in the same aircraft cabin. These users include pilots, cabin crew, and passengers. The pilots use the onboard network system to receive information related to operation of the passenger aircraft (e.g., sensor data) and to control some operations of aircraft components (e.g., as a part of flight control). The cabin crew uses the onboard network system for processing payments, demonstrating safety videos, and the like. Finally, the passengers use the onboard network system for Internet access, communication, entertainment (e.g., video, music), flight information, and the like. Since the passengers and their devices are physically located in the cabin, actions of the passengers can be observed, to some extent, by the flight crew. The flight crew is also able to control some of these actions (e.g., asking a passenger to turn off his or her advice). From the security standpoint, the onboard network system is also used to control some operations of the aircraft and maintain security of the system.

An onboard network system, described herein, comprises a cabin virtual router, used for controlling and analyzing all requests from passenger devices and for determining if access to other parts of the onboard network system should be allowed based on these requests. Specifically, the cabin virtual router receives all requests from all passenger devices and determines security threat associated with each request. In some examples, the requests are processed individually such that each request is associated with a specific security threat or no threat. Depending on the level of the security threat, if one is identified, the cabin virtual router is configured to perform one or more security operations. These operations are associated with each security threat level and specifically designed to reduce the security risk to other components of the onboard network system, in particular, to the flight deck.

In some examples, if the cabin virtual router determines that a request from a passenger device has a high-level security threat (e.g., the request exceeds the highest threshold), the cabin virtual router is disabled thereby preventing this passenger device or any other passenger devices from accessing the onboard network system. Some examples of high-level security threats are port scans, such as Null Scan, and TCP scan. This is a "locked out" approach, suitable for the most severe security threats. All services provided to passenger devices through the onboard network system are stopped at this point and not performed until the cabin virtual router is enabled again. In some examples, the cabin virtual router is configured to be enabled by a flight crew (e.g., after completing investigation of the incident) or by a ground crew (e.g., upon completion of the flight).

In the same or other examples, when the security threat still exits, but at a lower level, the cabin virtual router is configured to switch to a different operating system or perform some other security operation. For example, multiple different operating systems are available at the cabin virtual router, each configured to operate at a different security threat. For example, the cabin virtual router switches to an operating system that is less susceptible to the identified security threats. This is effectively a "higher obstacle" approach or a "moving target" approach, which still allows accessing the onboard network system by the passenger devices but performs differently. In some examples, the cabin virtual router modifies a request, in which a low-level security threat was detected. This request modification reduces the risk to the onboard network system while still allows forwarding the modified request to other components of the system. For examples, the performance of the onboard network system is throttled down to handle the modified request.

In some examples, if any security threat is detected, the cabin virtual router updates a security log. The security log aggregates all security threats during operation of the passenger aircraft and is used to update the cabin virtual router. For example, the cabin virtual router is periodically updated based on information in the security log. Unlike changing hardware components of a passenger aircraft, updating the cabin virtual router requires minimal if any involvement from aircraft operators and therefore, reduced certification requirements. In some examples, the update is performed solely based on the security log of this specific passenger aircraft. Alternatively, the update is performed externally, e.g., based on multiple security logs received by an aircraft operator from different passenger aircraft. Specifically, in some examples, the update is performed at the fleet level based on security threats gathered from all aircraft in that fleet and based on analyzing various information and trends in these security threats. In some examples, a security threat detected on one passenger aircraft is communicated (e.g., through an aircraft operator) and results in updates to cabin virtual routers for an entire airline or an entire fleet of certain aircraft types (e.g., all Boeing 777s). It should be noted that the updates of cabin virtual routers is performed even on passenger aircraft where no security threat was detected. This approach may be referred to as "proactive update" based on received at other aircraft. In some examples, various trending algorithms are used by an aircraft operator to analyze multiple security logs received from different passenger aircraft.

In general, a cabin virtual router is provided at any level between a passenger device and a cabin router. In some examples, a cabin virtual router is provided on a cabin device, connected to one or more area extension devices that are positioned throughout the cabin of the aircraft. Alternatively, the cabin virtual router is provided on each of area extension devices. In other examples, a cabin virtual router is provided on the cabin router, e.g., as a separate software layer.

Onboard Network System Examples

FIG. 1 is one example of onboard network system 100 for use in passenger aircraft 200. Specifically, onboard network system 100 is shown as a part of passenger aircraft 200. In some examples, onboard network system 100 is added to passenger aircraft 200 during its fabrication, as further described below with reference to FIG. 8. In the same or other examples, various components of onboard network system 100 are added or modified while passenger aircraft 200 is in service or being maintained. Onboard network system 100 is used during operation of passenger aircraft 200, both on the ground, (e.g., at the gate) and in the air.

Some components of onboard network system 100 are positioned in cabin 210, while other components are positioned in other parts of aircraft 200, outside of cabin 210, such as a cockpit. The division between cabin and non-cabin components is based on the location, physical access (e.g., by passengers), and communication access by passenger devices 180. As described above, onboard network system 100 is used by pilots (e.g., using flight deck 110), flight crew (e.g., using flight crew devices 150), and passengers (e.g., using passenger devices 180). The passengers access onboard network system 100 provides for its communication functions (e.g., internet access, VoIP), entertainment (e.g., movies, music), and the like, which improves the overall flight experience. On the other hand, when using passenger devices 180 submit requests to onboard network system 100, these requests may intentionally or unintentionally contain security threats. Onboard network system 100 is configured to handle such threats and isolate non-cabin components from these threats.

Referring to FIG. 1, passenger devices 180 communicate with onboard network system 100 through area extension devices 160, which may be also referred to as area distribution units. Area extension devices 160 are configured to extend access to the network (e.g., a wireless network) throughout the entire area inside cabin 210 as, for example, shown in FIG. 4. Some examples of area extension devices 160 are Wi-Fi boosters, repeaters, and extenders. In some examples, area extension devices 160 provide power and the in-flight entertainment (IFE) data to the passengers. Specifically, area extension device 160 streams data from IFE server 102 and locally stores this data to avoid network congestion, e.g., when multiple passenger devices 180 request IFE data at the same time. In other words, area extension devices 160 are operable as temporary storage for the IFE data. Furthermore, in some examples, area extension devices 160 comprise cabin virtual router 175 as schematically shown in FIG. 1.

Passenger devices 180 are not parts of onboard network system 100. Rather, passenger devices 180 are devices brought by passengers to cabin 210 and used by the passengers to interact with onboard network system 100, e.g., to obtain internee access during the flight, to obtain IFE data (videos, games, flight information, music, etc.), and other purposes. Some examples of passenger devices 180 are laptops, tablet computers, smartphones, and the like. In general, passenger device 180 is any device capable of establishing a communication link with onboard network system 100 and controlled by one of the passengers in cabin 210 of passenger aircraft 200.

In some examples, flight crew devices 152 access other components of onboard network system 100 through area extension devices 160, similar to passenger devices 180. Alternatively, flight crew devices 152 communicate with cabin router 150 directly, e.g., when cabin virtual router 175 is disabled. Some examples of flight crew devices 152 are credit card systems, laptops, tablet computers, smartphones, and the like. In some examples, flight crew devices 152 are used to update security log 178 in security log database 177, e.g., when a passenger, who submitted a high-level security threat request has been identified in cabin 210.

Cabin virtual router 175 is communicatively coupled to cabin router 150 and configured to control access of passenger devices 180 to other components of onboard network system 100. Specifically, cabin virtual router 175 is configured to receive request 185 from passenger device 180, determine security threat 176 associated with request 185, compare security threat 176 to one or more security thresholds, and perform one or more security operations if security threat 176 exceeds at least one of these security thresholds. These functionalities and corresponding operations of cabin virtual router 175 are described below in more detail with reference to FIGS. 2 and 3. Cabin virtual router 175 is also communicatively coupled to or include security log database 177, which stores security log 178 reflecting various instances of security threats exceeding the security thresholds.

For purposes of this disclosure, cabin virtual router 175 is a software-based routing framework that allows its host device (e.g., area extension device 160 in FIG. 1) to perform as a hardware router in onboard network system 100. Specifically, cabin virtual router 175 is configured to perform the network and packet routing functionality. In some examples, cabin virtual router 175 comprises a virtual router redundancy protocol (VRRP), e.g., by advertising cabin virtual router 175 to passenger devices 180 as a default gateway. Cabin virtual router 175 is backed by cabin router 150, which is a physical router. During operation, cabin virtual router 175 replies to passenger devices 180 with a media access control (MAC) address, when an address resolution protocol request is sent for the IP address of cabin virtual router 175. In some examples, multiple cabin virtual routers are used to receive/handle requests from different portions of passenger cabin or a large number of requests/bandwidth.

In some examples, cabin virtual router 175, comprises a computer usable medium having a computer readable program code embodied therein. This computer readable program code is adapted to be executed to implement method 400 for controlling operations of onboard network system 100 in cabin 210 of passenger aircraft 200. Specifically method 400 comprising: (a) receiving, at cabin virtual router 175 of onboard network system 100, request 185 from passenger device 180 located in cabin 210 of passenger aircraft 200; (b) determining, at cabin virtual router 175, security threat 176 associated with request 185 received from passenger device 180; (c) comparing security threat 176 to one or more security thresholds, each of one or more security thresholds corresponding to one of one or more security operations; (d) if security threat 176 exceeds at least one security threshold of one or more security thresholds, performing a security operation, selected from one or more security operations 402 and corresponding to at least one security threshold exceeded by security threat 176 and updating security log 178 with security threat 176; and (e) if security threat 176 is below each of one or more security thresholds, transmitting request 185 from cabin virtual router 175 to cabin router 150 of onboard network system 100. Other examples and features of the methods are described below.

As noted above, cabin router 150 is a physical router, which serves as an interface between cabin virtual router 175 and non-cabin components. As shown in FIG. 1 example, cabin router 150 is communicatively coupled with network extension device 130.

Network extension device 130 is provides an interface to Ethernet, ARINC 429 (Aeronautical Radio INC—technical standard for avionics data bases), and discrete communications onboard and off-board of passenger aircraft 200. Some examples of functions of network extension device 130 include (a) read and distribute ARINC 429 from data busses, (b) allow Ethernet clients to transmit messages over ACARS (aircraft communications addressing and reporting system) proxy by configuring ACARS terminals and supporting down/uplink ACARS message; (c) support ARINC 615-¾ data load of connected system; (d) manual and automatic client security credential generation, layer 3 IP (internet protocol) routing: packet filtering, routes, DHCP (dynamic host configuration protocol) relay, multicast routing, and the like. Network extension device 130 functions as a "domain guard" to protect onboard network system 100 from protruding and to prevent the suspected data down and up load.

Network extension device 130 is communicatively coupled to onboard network system file server 120. Onboard network system file server 120 is the main server in onboard network system 100 where software operation and all of main data/applications of onboard network system 100 reside.

Network extension device 130 is also communicatively coupled to broadband over powerline router 140 (i.e., a BPL router), which provides either internal or external communication to onboard network system 100 via powerline. One example of an external communication provided by broadband over powerline router 140 is to a gate via an electrical power cable (also known as "a stinger cable"), e.g., when passenger aircraft 200 is on the ground by the gate.

Network extension device 130 is also communicatively coupled to connectivity server 104, SatCom data unit 106, and gate connectivity unit 108. Connectivity server 104 is the server for the connectivity system where the entertainment files, software operation are store for redistribution to the passengers via the Cabin Wireless Access Points and area distribution unit. SatCom data unit 106 provides voice and data communications between the aircraft and selected ground stations through an Inmarsat satellite.

Onboard network system file server 120 is communicatively coupled to flight deck 110. Flight deck 110 receives data from various systems of passenger aircraft 200, some examples of which are described below with reference to FIG. 9. Furthermore, flight deck 110 receives data from ground control, from gate operations, and other external sources. This data is presented to pilots at flight deck 110 using various instrumentation, such as captain's display, an on-board maintenance laptop, and the like.

Onboard network system file server 120 is also communicatively coupled to in-flight entertainment (IFE) server 102. IFE server 102 is the server to store movies, aircraft maps, audio, and the like for passenger inflight entertainment.

Methods of Controlling Operations of Onboard Network Systems

Figure 2:
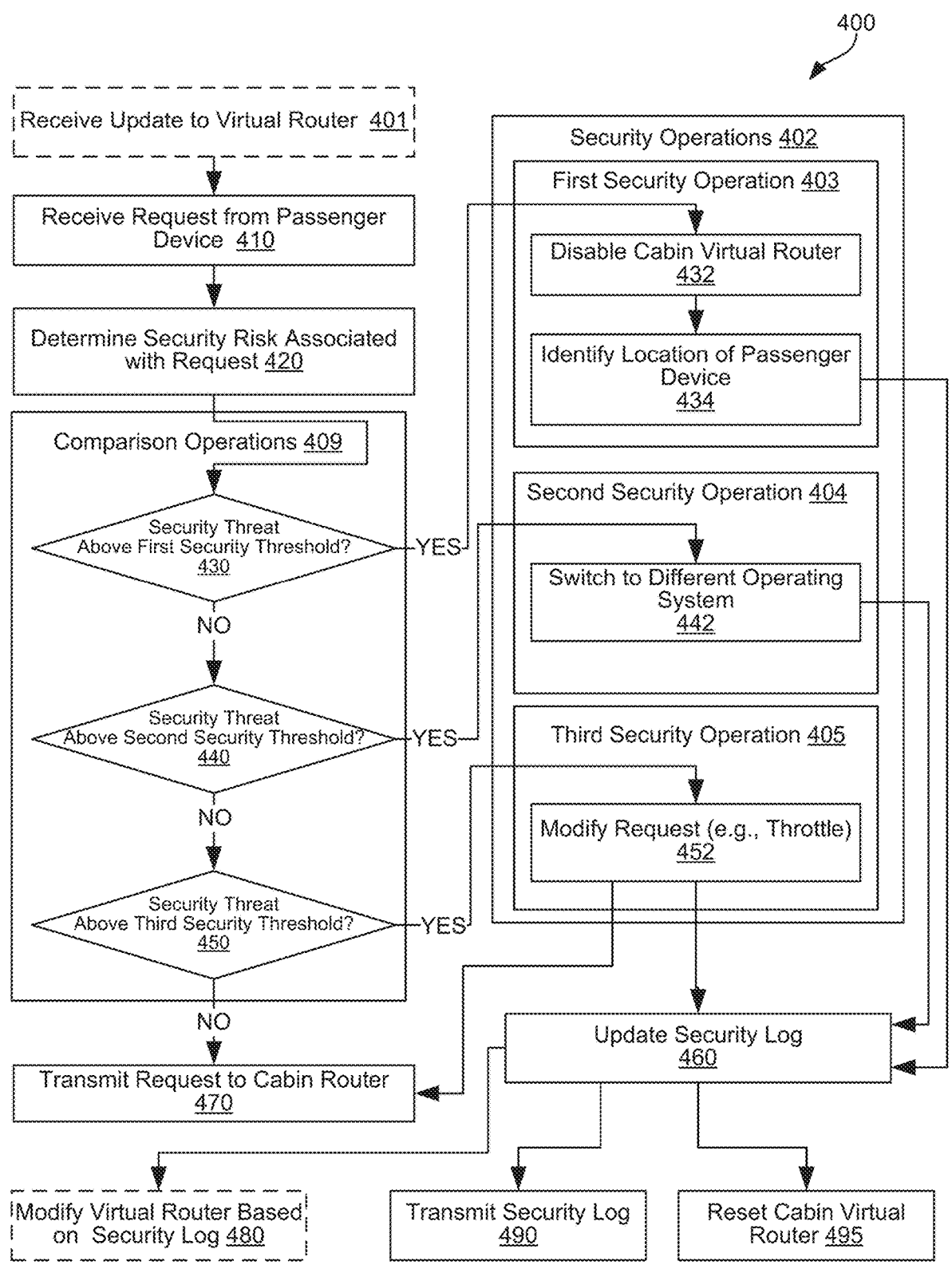
FIG. 2 is a process flowchart corresponding to a method of controlling some operations of the onboard network system, illustrated in FIG. 1, in accordance with some examples.
Figure 3:
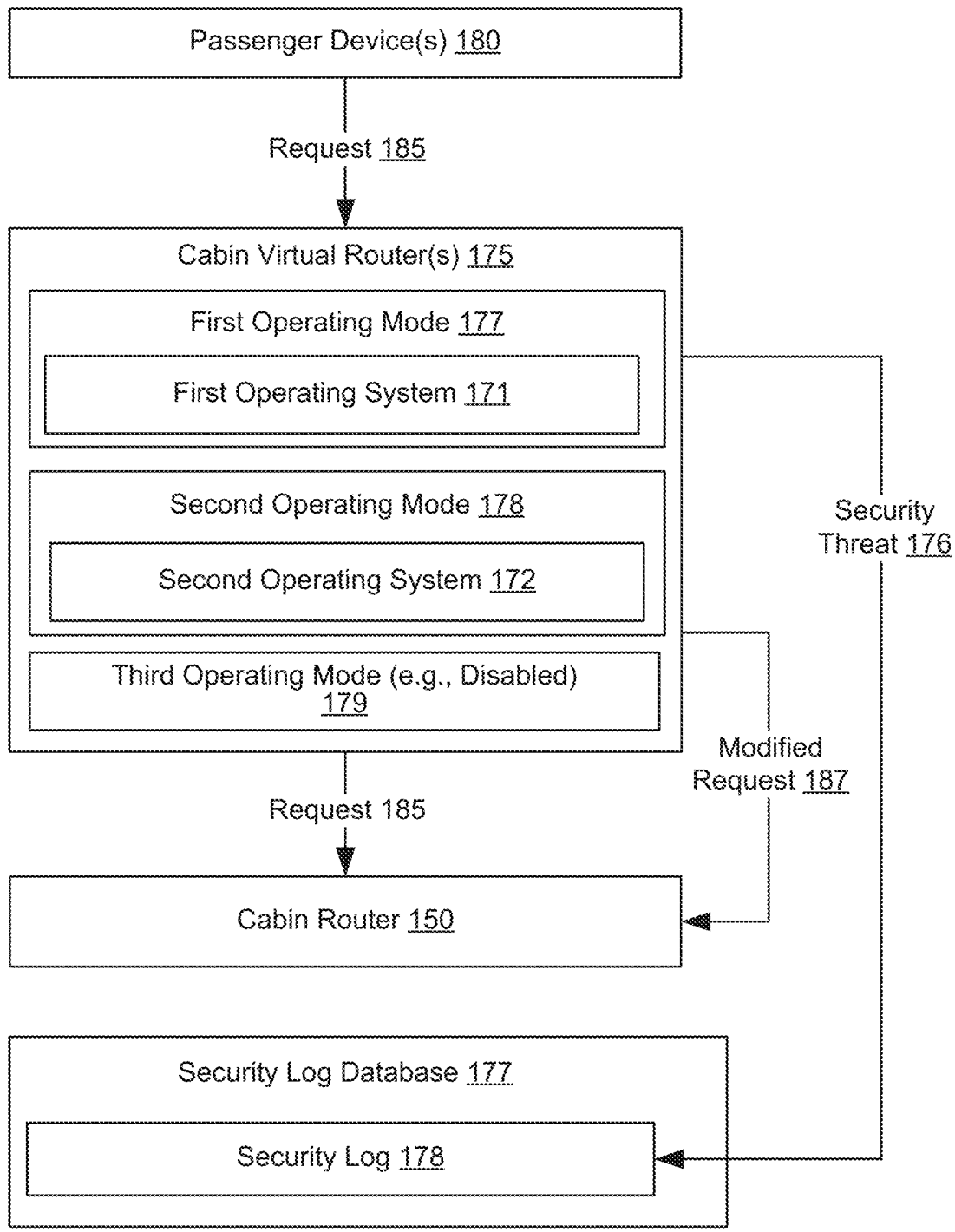
FIG. 3 is a schematic illustration of data transfers between some components of the onboard network system of FIG. 1 during various operations of the method of FIG. 2 in accordance with some examples.

FIG. 2 is a process flowchart corresponding to method 400 for controlling operations of onboard network system 100 in cabin 210 of passenger aircraft 200. Various examples of onboard network system 100 are described above with reference to FIG. 1. FIG. 3 is a schematic illustration of data transfers between various components of onboard network system 100.

In some examples, method 400 commences with receiving an updated version of cabin virtual router 175 (block 401). For example, aircraft operator 610 analyses security logs received from different passenger aircraft and, based on these security logs, generates the updated version of cabin virtual router 175. This updated version addresses various security threats listed in the security logs. A process of generating the updated version is described below with reference to FIGS. 5 and 6. Alternatively, an updated version of cabin virtual router 175 is generated by onboard network system 100 or selected from the available version stored in onboard network system 100.

The updated version of cabin virtual router 175 is used in subsequent operations of method 400. The updated version of virtual router 175 is installed on one or more components of onboard network system 100, such as area extension devices 160, or other components. The frequency of the operation corresponding to block 401 depends on the availability of an updated version and previous threats received by virtual router 175, e.g., the content of security log 178. For example, in some examples, method 400 commences with checking security log 178 and determined if an updated version of cabin virtual router 175 is needed.

Method 400 comprises receiving, at a cabin virtual router 175, request 185 from passenger device 180 (block 410). Passenger device 180 is located in cabin 210 of passenger aircraft 200. In some examples, passenger device 180 is connected to onboard network system 100 and sends request 185 through area extension devices 160.

Method 400 comprises determining, at cabin virtual router 175, security threat 176 associated with request 185 (block 420). As noted above, request 185 is received from passenger device 180. Security threat 176 is determined as follows.

Method 400 comprises comparing security threat 176 to one or more security thresholds (block 409). For example, FIG. 2 illustrates three different thresholds. However, one, having ordinary skill in the art, will understand that any number of thresholds is within the scope. Each security threshold corresponds to one or more security operations. A shown in FIG. 2, the first security threshold (block 430) corresponds to first security operation 403. The second security threshold (block 440) corresponds to second security operation 404. The third security threshold (block 450) corresponds to third security operation 405.

Referring to FIG. 2, if security threat 176 exceeds at least one the security thresholds, method 400 proceeds with performing a corresponding security operation. For example, if security threat 176 exceeds the first security threshold (block 430), method 400 proceeds with performing first security operation 403. However, if security threat 176 does not exceed the first security threshold (block 430), first security operation 403 is not performed. Instead, in some examples, method 400 proceeds with checking security threat 176 against additional security thresholds, such as the second security threshold (block 440) and, later, the third security threshold (block 450). These additional security thresholds correspond to lesser security threats (i.e., have lower levels) than the first security threshold. As such, in some examples, security threat 176 is checked against these additional security thresholds only if security threat 176 does not exceed the first security threshold. Alternatively, security threat 176 is checked against one or more additional security thresholds even if security threat 176 exceeds the first security threshold. For example, different security thresholds are set for different types of security threats.

If security threat 176 exceeds the second security threshold (block 440), method 400 proceeds with second security operation 404. On the other hand, if security threat 176 does not exceed the second security threshold (block 440), in some examples, method 400 proceeds with checking security threat 176 against the third security threshold (block 450). If security threat 176 exceeds the third security threshold (block 450), method 400 proceeds with third security operation 405. Performing either one of the security operations also corresponds to updating security log 178 (block 460), which is described below. Finally, if security threat 176 is below each of one or more security thresholds (e.g., block 430, block 440, and block 450) or no security threat was detected in request 185, then method 400 proceed with transmitting request 185 from cabin virtual router 175 to cabin router 150 (block 470). In this example, no security operations are performed.

Each of security operations presented in FIG. 2 will be now described in more detail. First security operation 403 comprises disabling cabin virtual router 175 (block 432). Once cabin virtual router 175 is disabled, not further requests from the same or different passenger devices can be received by onboard network system 100. The passenger devices are effectively disconnected from onboard network system 100 until cabin virtual router 175 is reset, as further described below with reference to block 495.

Figure 4:
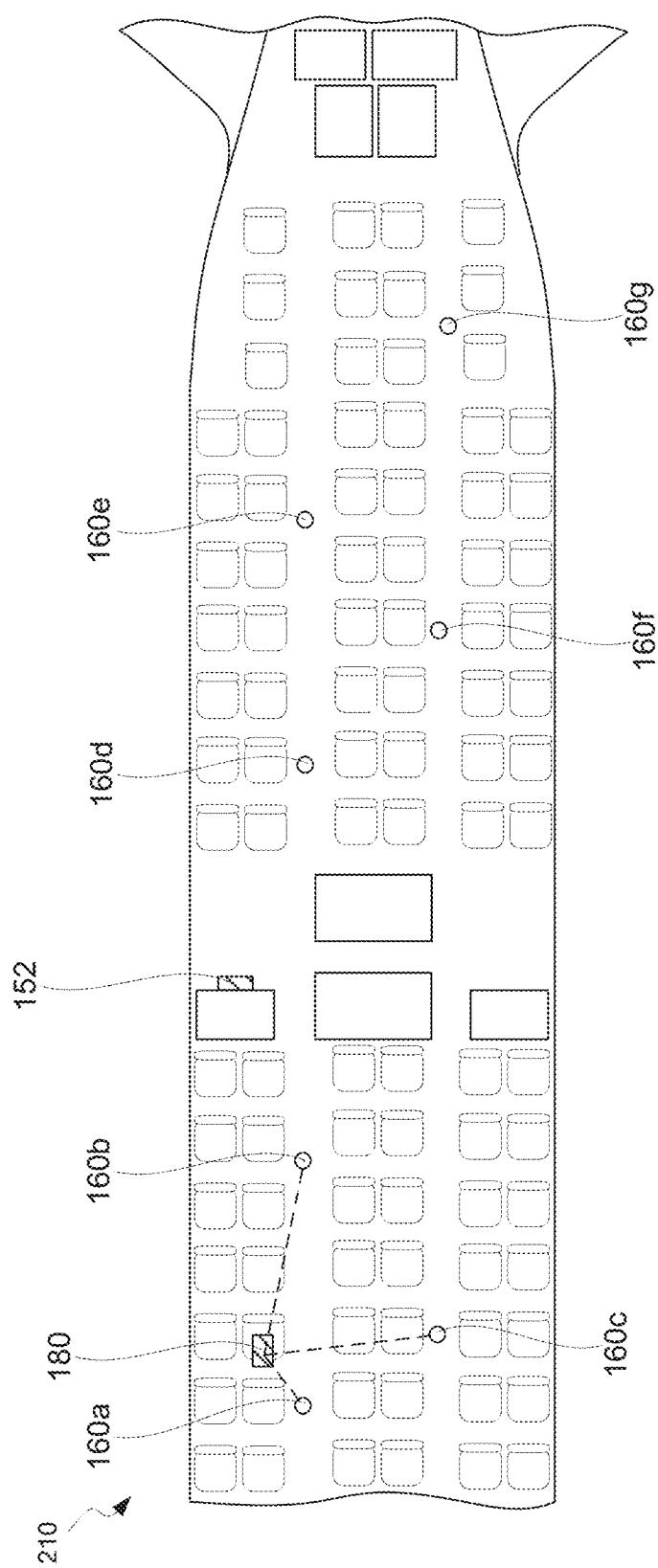
FIG. 4 is a schematic illustration of a cabin of a passenger aircraft, showing some components of the onboard network system of FIG. 1.

In some examples, first security operation 403 further comprises identifying location of passenger device 180 in cabin 210 of passenger aircraft 200 (block 434). Referring to FIG. 4, in some examples, identifying the location comprises determining the signal strength from passenger device 180 at multiple area distribution devices 160a-160g positioned at different locations in cabin 210 of passenger aircraft 200. In this illustrated example, passenger device 180 is closest to area distribution device 160a, while passenger device 180 is still able to communicate with area distribution device 160b and area distribution device 160c. The communication range of passenger device 180 and other area distribution devices 160d-160g do not overlap. Based on this information received from area distribution devices 160a-160g, cabin virtual router 175 can estimate the actual position of passenger device 180 in cabin 210. This position estimate is then communicated to flight crew device 152 to alert the flight crew of the activity in cabin 210 and, in some examples, instructing to more precisely estimate the location, identify the passenger, and take certain actions. As such, in some examples, identifying the location comprises receiving input from flight crew device 152.

In some examples, second security operation 404 comprises switching to cabin virtual router 175 from a first operating system to a second operating system (block 442). Referring in FIG. 3, in the illustrated example, cabin virtual router 175 has three operating modes. In first operating mode 191, cabin virtual router 175 utilizes first operating system 171. In second operating mode 192, cabin virtual router 175 utilizes second operating system 172. In third operating mode 192, cabin virtual router 175 is disabled and is not operational.

Second operating system 172 has a higher security threat resistance than first operating system 171. As such, switching to second operating system 172 allows overcoming some security threats, e.g., up to the second security threshold.

In some examples, second security operation 404 further comprises blocking, at cabin virtual router 175, request 185 received from passenger device 180. For example, FIG. 2 does not show any connecting lines between second security operation (block 404) and transmitting request 185 to cabin router 150 (block 470). In these examples, cabin virtual router 175 is still operational after completing second security operation 404. However, due to security threat 176 associated with request 185, request 185 is not transmitted to cabin router 150 and is simply ignored by cabin virtual router 175.

In some examples, third security operation 405 comprises modifying request 185 received from passenger device 180 at cabin virtual router 175 (block 452). This modifying operation generates modified request 187. As further shown in FIGS. 2 and 3, modified request 187 is transmitted from cabin virtual router 175 to cabin router 150 (block 470). Specifically, the third threshold is lower than each of second threshold and first threshold. Therefore, security threat 176, which passes the first security threshold and the second security threshold, but not the third security threshold, is still transmitted in the modified form. In some examples, modified request 187, generated at cabin virtual router 175, is throttled down in comparison to request 185, received from passenger device 180.

If security threat 176 does not pass at least one of the security thresholds, method 400 comprises updating security log 178 (block 460). In some examples, updating security log 178 comprises at least one of the following (1) recording an IP address of passenger device 180, (2) recording a time and date of request 185 received from passenger device 180, (3) recording at least one of one or more security thresholds exceeded by request 185 received from passenger device 180, (4) recording the airline, flight information, and aircraft type, (5) recording an operating system used by cabin virtual router 175 at the time of request 185, and/or (6) recording security operations invoked by cabin virtual router 175 in response to security threat 176, and the like. FIG. 3 illustrates security threat 176 being added to security log 178 in security log database 177.

In some examples, method 400 further comprises transmitting security log 178 from passenger aircraft 200 to aircraft operator 610 (block 490). This operation is performed using onboard network system 100. In these examples, aircraft operator 610 analyses security log 178 and determines various updates needed for security log 178. In some examples, aircraft operator 610 aggregates security logs from different aircraft as further described below with reference to FIGS. 5 and 6. For example, aircraft operator 610 is an airline, which aggregates security logs from multiple aircraft operated by this airline. In another example, aircraft operator 610 is an aircraft manufacturer, which aggregates security logs from aircraft produced by this manufacturer. Specifically, cabin virtual router 175 (e.g., an updated version described above) is generated by aircraft operator 610 based multiple security logs received from a fleet of passenger aircrafts. Once generated, cabin virtual router 175 is transmitted by aircraft operator 610 to passenger aircraft 200 and received by passenger aircraft 200 (block 401). Specifically, in some examples, method 400 further comprising receiving, at onboard network system 100, an updated version of cabin virtual router 175 (block 401). The updated version of cabin virtual router 175 is generated by aircraft operator 610 based on at least an additional security log received from an additional passenger aircraft.

In some examples, the update of cabin virtual router 175 is performed internally by onboard network system 100. Specifically, method 400 comprises updating cabin virtual router 175 based on security log 178 and using onboard network system 100.

In some examples, method 400 further comprises resetting cabin virtual router 175 (block 495). For example, this operation is performed after passenger aircraft 200 is on the ground (e.g., by the ground crew). In some example, this operation is performed by a flight crew, while passenger aircraft 200 is still in the air.

Methods of Processing Security Logs

Figure 5:
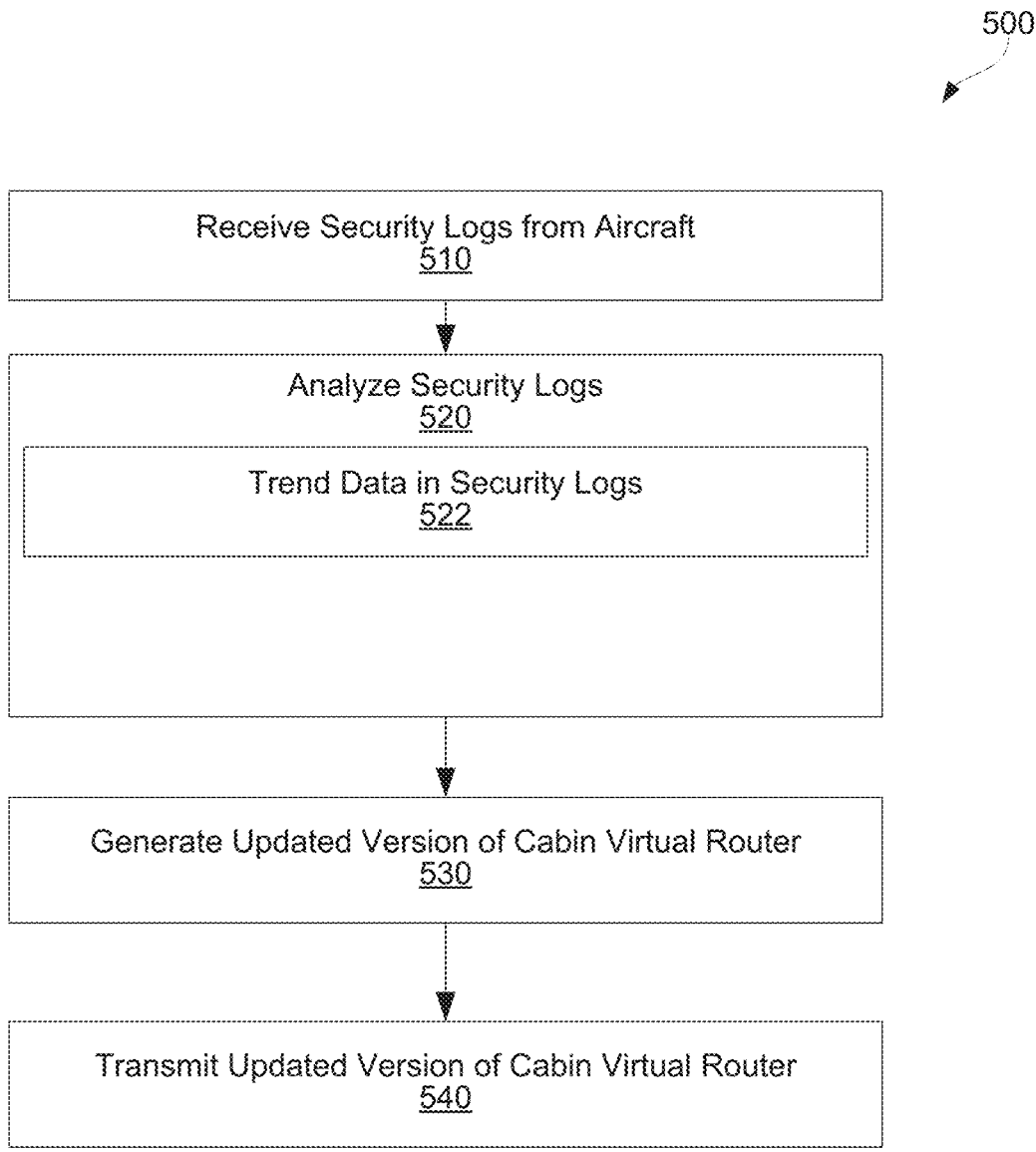
FIG. 5 is a process flowchart corresponding to a method of processing security logs received by an aircraft operator from aircrafts, in accordance with some examples.
Figure 6:
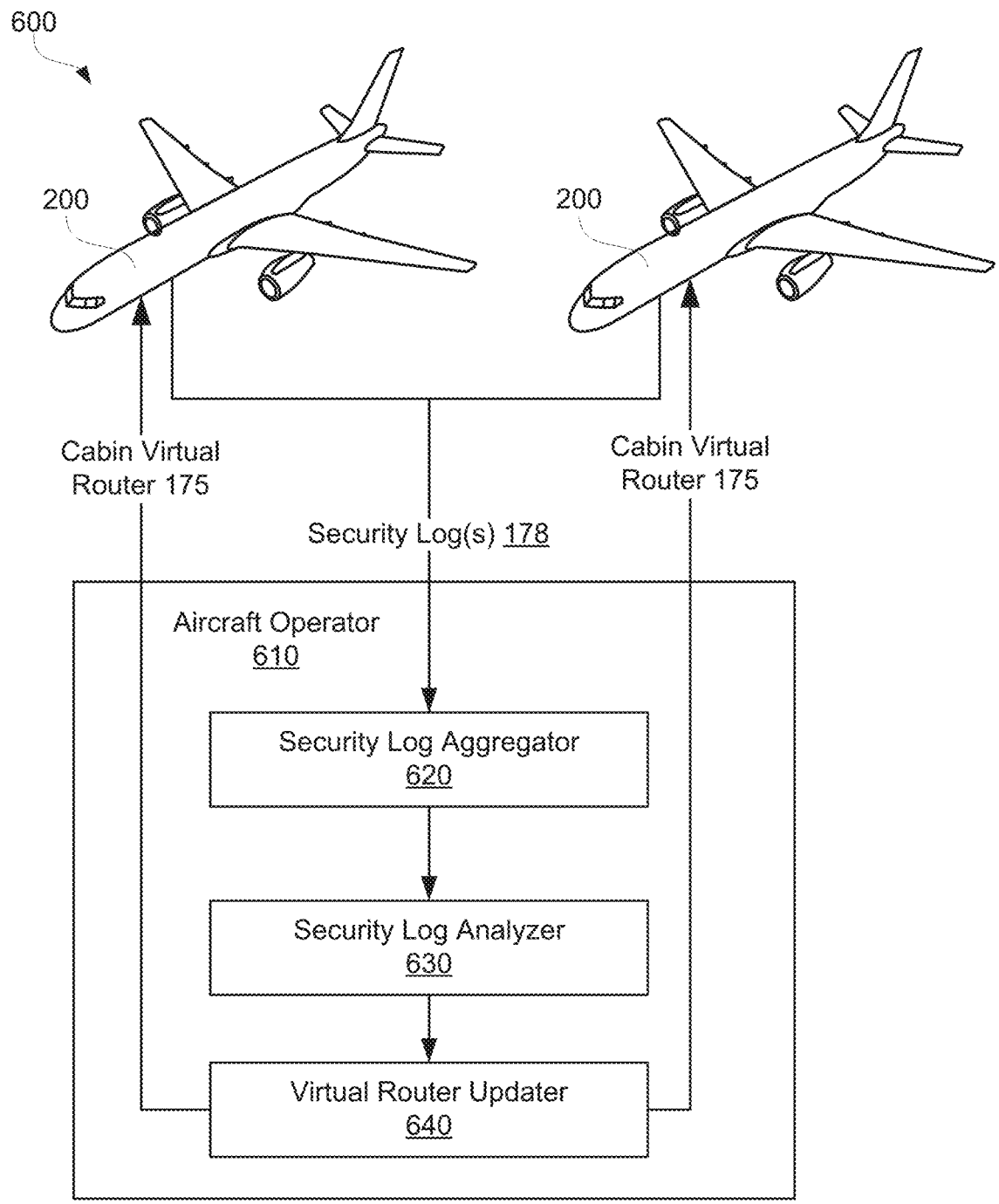
FIG. 6 is a flowchart of a system for handling security logs and comprising an aircraft operator and multiple aircrafts.

FIG. 5 is a process flowchart corresponding to method 500 of processing security logs 178 received by aircraft operator 610 from one or more passenger aircraft 200, in accordance with some examples. FIG. 6 illustrates corresponding data flow between aircraft operator 610 and multiple passenger aircraft 200. FIG. 6 also illustrates various components of aircraft operator 610, responsible for processing security logs 178 and updating cabin virtual router 175.

Method 500 comprises receiving security logs 178 from passenger aircraft 200 (block 510). As described above, passenger aircraft 200 generates security log 178 using cabin virtual router 175 and stores security log 178 in security log databases 177. Various examples of security log 178 and its content is described with reference to FIG. 2. The frequency of this receiving operation is set by aircraft operator 610. In some examples, security log 178 is received by aircraft operator 610 after each flight of passenger aircraft 200. As such, any security threat registered by any one of passenger aircraft 200 is communicated to aircraft operator 610 and can be used to mitigate security threat on all passenger aircraft 200. Referring to FIG. 6, in some examples, aircraft operator 610 comprises security log aggregator 620, for receiving security logs 178 from passenger aircraft 200. For example, security log aggregator 620 comprises a communication module and a database for storing all received security logs.

Referring to FIG. 5, method 500 comprises analyzing security logs 178 (block 520). In some examples, the data provided in security logs 178 is trended (e.g., over time) (block 522). In the same or other examples, the analyzing operation comprises considering flight information associated with each security threat (e.g., departure and arrival airports, departure and arrival date and time; airline, passenger information, and the like). Referring to FIG. 6, in some examples, aircraft operator 610 comprises security log analyzer 630, for analyzing security logs 178 received from passenger aircraft 200.

Referring to FIG. 5, method 500 comprises generating an updated version of cabin virtual router 175 (block 530). The updating version is generated based on analyzing the data in security logs 178 received from passenger aircraft 200. Referring to FIG. 6, in some examples, aircraft operator 610 comprises router updater 640, for generating an updated version of cabin virtual router 175. Referring to FIG. 5, method 500 comprises transmitting the updated version of cabin virtual router 175 to passenger aircraft 200 (block 540).

Computer System Examples

Figure 7:
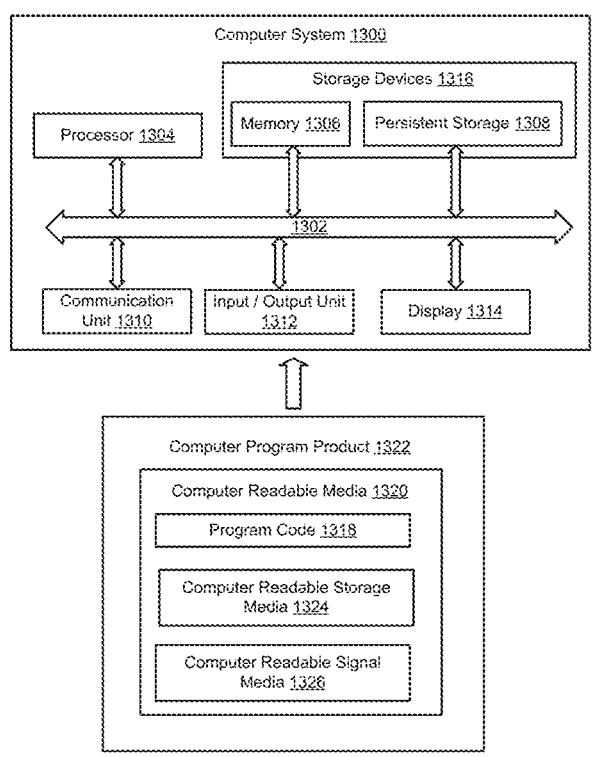
FIG. 7 illustrates a computer system configured in accordance with some examples.

FIG. 7 illustrates computer system 1300 and computer program product 1322, configured in accordance with some examples. Various components of the onboard network system 100, described above, are implementable as and supportable by components of computer system 1300 and computer program product 1322.

In various examples, computer system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation. For example, persistent storage 1308 may contain one or more components or devices. For example, persistent storage 1308 may be a hard drive, a flash memory, a rewritable optical disk, a rewritable magnetic tape, or some combination of the above.

The media used by persistent storage 1308 also may be removable. For example, a removable hard drive may be used for persistent storage 1308.

Communications unit 1310, in these illustrative examples, provides for communications with other computer systems or devices. In these illustrative examples, communications unit 1310 may be a network interface card, universal serial bus (USB) interface, or other suitable communications device/interface.

Input/output unit 1312 allows for input and output of data with other devices that may be connected to computer system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different examples may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different examples may be embodied on different physical or computer readable storage media, such as memory 1306 or persistent storage 1308.

Program code 1318 is located in a functional form on computer readable media 1320 that is selectively removable and may be loaded onto or transferred to computer system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to computer system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for computer system 1300 are not meant to provide architectural limitations to the manner in which different examples may be implemented. The different illustrative examples may be implemented in a computer system including components in addition to and/or in place of those illustrated for computer system 1300. Other components shown in FIG. 7 can be varied from the illustrative examples shown. The different examples may be implemented using any hardware device or system capable of running program code 1318.

Aircraft and Spacecraft Examples

As discussed above, various examples of onboard network system 100 disclosed herein are used on aircraft 200.

Figure 8:
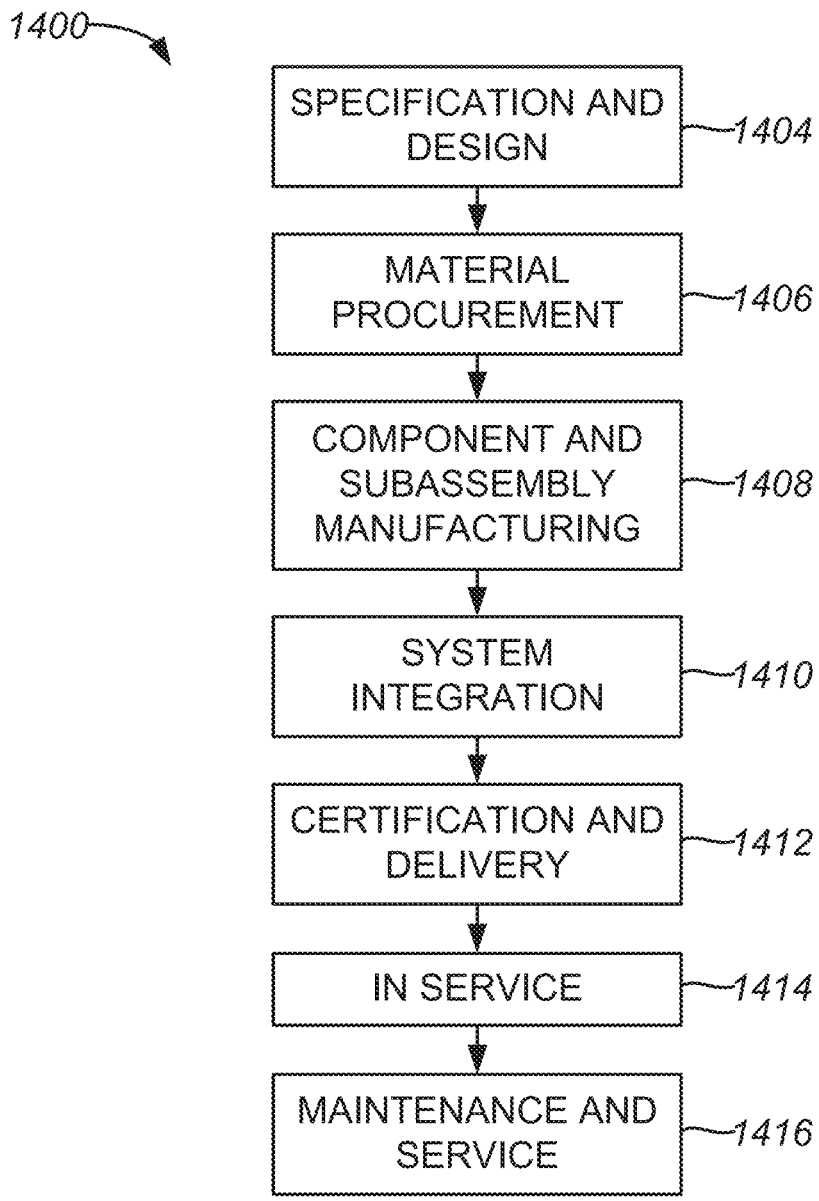
FIG. 8 is a process flowchart corresponding to a method for manufacturing and service the aircraft.
Figure 9:
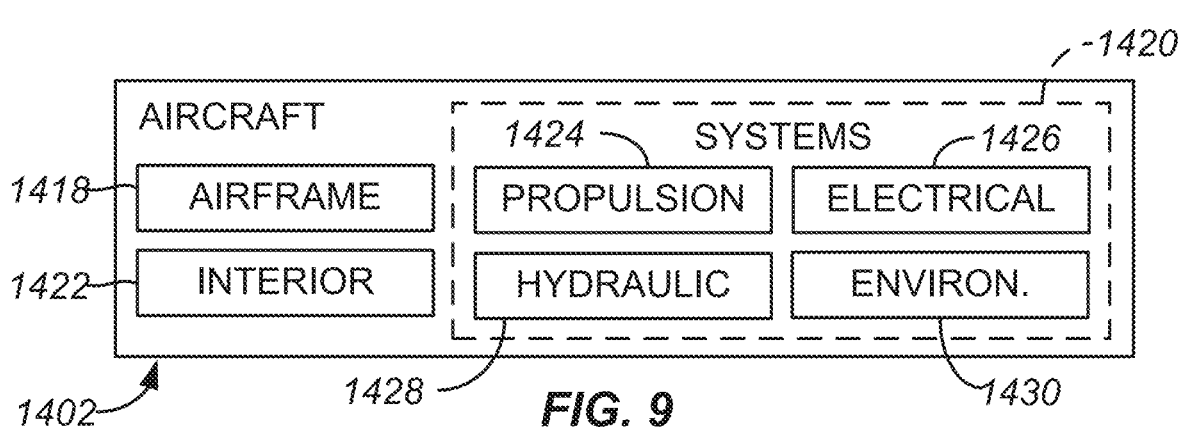
FIG. 9 illustrates a block diagram of an example of an aircraft, in accordance with some examples.

Accordingly, the manufacture of onboard network system 100 may be described in the context of an aircraft manufacturing and service method 1400 as shown in FIG. 8 and aircraft 200 as shown in FIG. 9. During pre-production, illustrative method 1400 may include specification and design 1404 of aircraft 200 and material procurement 1406. During production component and subassembly manufacturing stages 1408 and system integration stage 1410 of aircraft 200 takes place. Thereafter, aircraft 200 may go through certification and delivery 1412 in order to be placed in service 1414. While in service by a customer, aircraft 200 is scheduled for routine maintenance and service 1416 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, aircraft 200 produced by illustrative method 1400 may include an airframe 1418 with plurality of systems 1420 and interior 1422, which includes cabin 210, schematically shown in FIG. 4. Examples of high-level systems 1420 include one or more of a propulsion system 1424, an electrical system 1426, a hydraulic system 1428, and an environmental system 1430. Although an aerospace example is shown, the principles of the examples described herein may be applied to other industries.

Devices and methods embodied herein may be employed during any one or more of the stages of method 1400. For example, components or subassemblies corresponding to stages 1408 and 1410 may be fabricated or manufactured in a manner similar to components or subassemblies produced while aircraft 200 is in service. Also, one or more device examples, method examples, or a combination thereof may be utilized during stages 1408 and 1410, for example, by substantially expediting assembly of or reducing the cost of an aircraft 1402. Similarly, one or more of device examples, method examples, or a combination thereof may be utilized while aircraft 200 is in service, for example and without limitation, to maintenance and service 1416.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for controlling operations of an onboard network system in a cabin of a passenger aircraft, the method comprising:
   receiving, at a cabin virtual router of the onboard network system, a request from a passenger device located in the cabin of the passenger aircraft;
   determining, at the cabin virtual router, a security threat associated with the request received from the passenger device;
   comparing the security threat to one or more security thresholds, each corresponding to one of one or more security operations, wherein:
      the one or more security thresholds comprises a first threshold,
      the first threshold corresponds to a first security operation of the one or more security operations,
      the first security operation comprises disabling the cabin virtual router,
      the first security operation further comprises identifying a location of the passenger device in the cabin of the passenger aircraft; and
   when the security threat exceeds at least one security threshold of the one or more security thresholds,
      performing a security operation, selected from the one or more security operations and corresponding to the at least one security threshold exceeded by the security threat and
      updating a security log with the security threat, and
   when the security threat is below each of the one or more security thresholds, transmitting the request from the cabin virtual router to a cabin router of the onboard network system.

2. The method of claim 1, wherein:
   the one or more security thresholds comprises a first threshold,
   the first threshold corresponds to a first security operation of the one or more security operations,
   the first security operation comprises disabling the cabin virtual router.

3. The method of claim 1, wherein identifying the location of the passenger device in the cabin of the passenger aircraft comprises at least one of
   determining signal strength from the passenger device at multiple area distribution devices positioned at different locations in the cabin of the passenger aircraft, or
   receiving input from a flight crew device.

4. The method of claim 2, wherein:
   the one or more security thresholds comprises a second threshold, different than the first threshold,
   the second threshold corresponds to a second security operation of the one or more security operations, and
   the second security operation comprises switching the cabin virtual router from a first operating system to a second operating system.

5. The method of claim 4, wherein the second operating system has a higher security threat resistance than the first operating system.

6. The method of claim 4, wherein:
   the second threshold is lower than the first threshold, and
   performing the security operation comprises performing only the second security operation.

7. The method of claim 4, wherein the second security operation further comprises blocking, at the cabin virtual router, the request received from the passenger device.

8. The method of claim 4, wherein:
the one or more security thresholds comprises a third threshold, different than the first threshold and the second threshold,
the third threshold corresponds to a third security operation of the one or more security operations, and
the third security operation comprises modifying the request received from the passenger device at the cabin virtual router, thereby generating a modified request and transmitting the modified request from the cabin virtual router to the cabin router.

9. The method of claim 8, wherein the modified request, generated at the cabin virtual router, is throttled down in comparison to the request, received from the passenger device.

10. The method of claim 8, wherein:
the third threshold is lower than each of the second threshold and the first threshold,
performing the security operation comprises performing only the third security operation.

11. The method of claim 1, wherein updating the security log comprises at least one of:
recording an IP address of the passenger device,
recording a time of the request received from the passenger device, or
recording the at least one security threshold exceeding the at least one security threshold.

12. The method of claim 1, further comprising, using the onboard network system, transmitting the security log from the passenger aircraft to an aircraft operator.

13. The method of claim 12, further comprising receiving, at the onboard network system, an updated version of the cabin virtual router, wherein the updated version of the cabin virtual router is generated by the aircraft operator based on at least an additional security log received from an additional passenger aircraft.

14. The method of claim 13, wherein the cabin virtual router is generated by the aircraft operator based on multiple security logs received from a fleet of passenger aircrafts.

15. The method of claim 1, further comprising, using the onboard network system, updating the cabin virtual router based on the security log.

16. The method of claim 1, further comprising resetting the cabin virtual router when the passenger aircraft is landed.

17. An onboard network system for controlling network communication in a cabin of a passenger aircraft, the onboard network system comprising:
a cabin router; and
a cabin virtual router, communicatively coupled to the cabin router and configured to:
receive a request from a passenger device located in the cabin of the passenger aircraft;
determine a security threat associated with the request received from the passenger device;
compare the security threat to one or more security thresholds, each of the one or more security thresholds corresponding to one of one or more security operations;
perform a security operation, selected from the one or more security operations and corresponding to at least one security threshold exceeded by the security threat and updating a security log with the security threat, when the security threat exceeds at least one security threshold of the one or more security thresholds; and
transmit the request to the cabin router of the onboard network system, when the security threat is below each of the one or more security thresholds,
wherein the cabin virtual router has a first operating mode, a second operating mode, and a third operating mode, wherein:
in the first operating mode, the cabin virtual router uses a first operating system;
in the second operating mode, the cabin virtual router uses a second operating system, different from the first operating system; and
in the third operating mode, the cabin virtual router is disabled.

18. A cabin virtual router, comprising a computer usable medium having a computer readable program code embodied therein, said computer readable program code adapted to be executed to implement a method for controlling operations of an onboard network system in a cabin of a passenger aircraft, the method comprising:
receiving, at a cabin virtual router of the onboard network system, a request from a passenger device located in the cabin of the passenger aircraft;
determining, at the cabin virtual router, a security threat associated with the request received from the passenger device;
comparing the security threat to one or more security thresholds, each of the one or more security thresholds corresponding to one of one or more security operations;
when the security threat exceeds at least one security threshold of the one or more security thresholds,
performing a security operation, selected from the one or more security operations and corresponding to the at least one security threshold exceeded by the security threat and
updating a security log with the security threat;
when the security threat is below each of the one or more security thresholds, transmitting the request from the cabin virtual router to a cabin router of the onboard network system;
transmitting the security log from the passenger aircraft to an aircraft operator; and
receiving an updated version of the cabin virtual router, wherein the updated version of the cabin virtual router is generated by the aircraft operator based on at least an additional security log received from an additional passenger aircraft.

19. The method of claim 1, further comprising generating, at the onboard network system, an updated version of the cabin virtual router based on at least an additional security log received from an additional passenger aircraft.

20. The method of claim 1, wherein the one or more security thresholds comprises multiple security thresholds, and wherein comparing the security threat to the one or more security thresholds comprises sequentially comprising the security threat to each of the multiple security threshold.

* * * * *